United States Patent [19]

Guilbeau

[11] 4,398,848
[45] Aug. 16, 1983

[54] MARINE ENERGY CELL

[76] Inventor: Edgar A. Guilbeau, 3106 Fairmont Ct., Sugarland, Ft. Bend County, Tex. 77478

[21] Appl. No.: 259,852

[22] Filed: May 4, 1981

[51] Int. Cl.³ .................... B63H 21/04; E02B 3/22
[52] U.S. Cl. ................................ 405/212; 114/219; 405/215
[58] Field of Search ............... 114/219, 220; 405/212, 405/215

[56] References Cited

U.S. PATENT DOCUMENTS

| | | | |
|---|---|---|---|
| 3,564,858 | 2/1971 | Pogonowski | 114/219 X |
| 4,005,672 | 2/1977 | Files | 114/219 |
| 4,273,473 | 6/1981 | Thomerson | 114/219 |
| 4,311,412 | 1/1982 | Guilbeau | 114/219 |
| 4,337,009 | 6/1982 | Jackson | 405/212 |
| 4,338,046 | 7/1982 | Thomerson | 405/212 |

Primary Examiner—Sherman D. Basinger
Attorney, Agent, or Firm—Frease & Bishop

[57] ABSTRACT

An energy-absorbing device for mounting a ship fending barrier on a marine docking structure. The device has two units that are connected together. Each unit has spaced inner and outer tubular elements and an intervening elastomeric sleeve in the space bonded to each element. The inner elements of the two units have fixed connection with each other. The outer elements of the two units have fixed connection, respectively, with the docking structure and the barrier.

3 Claims, 6 Drawing Figures

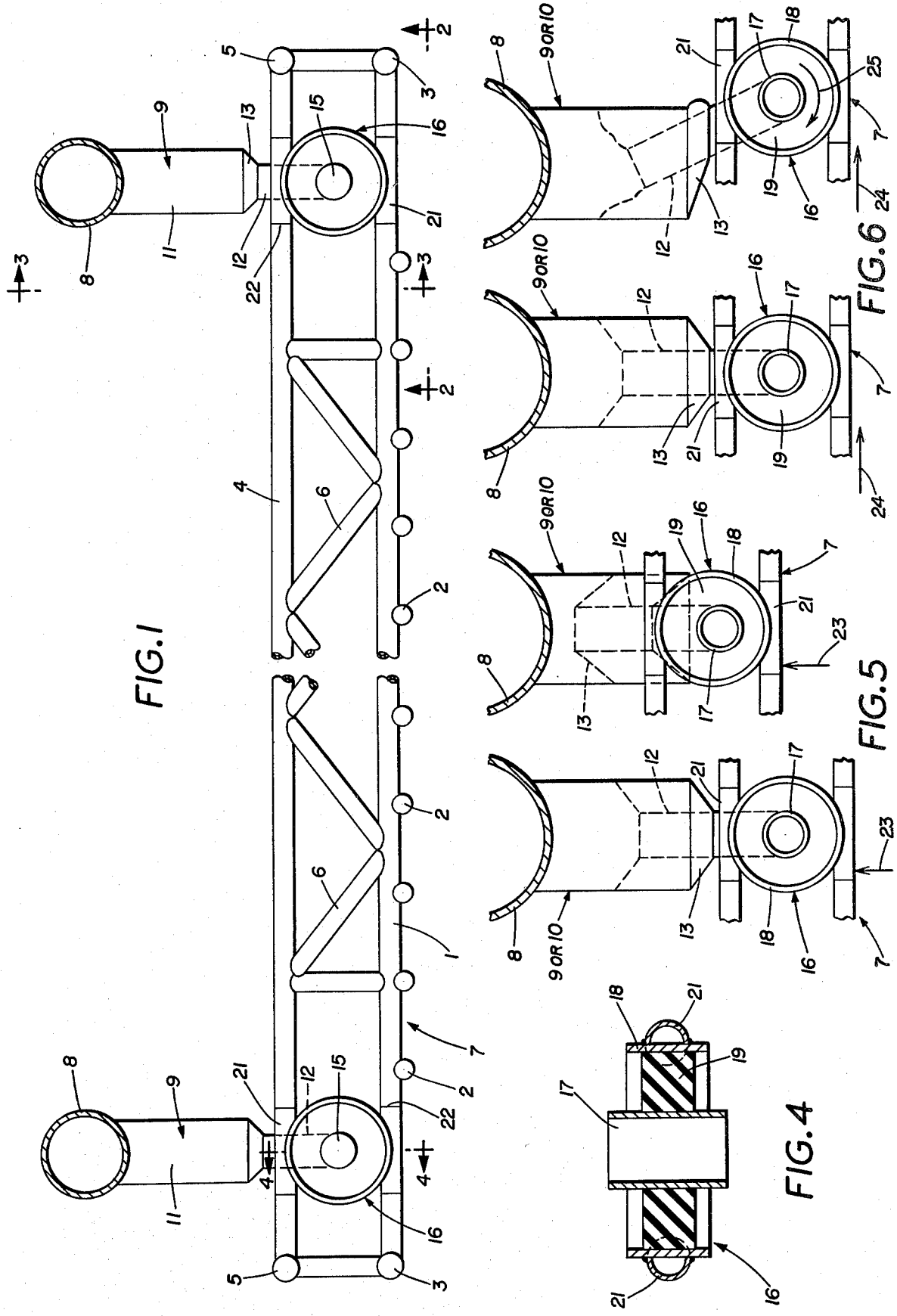

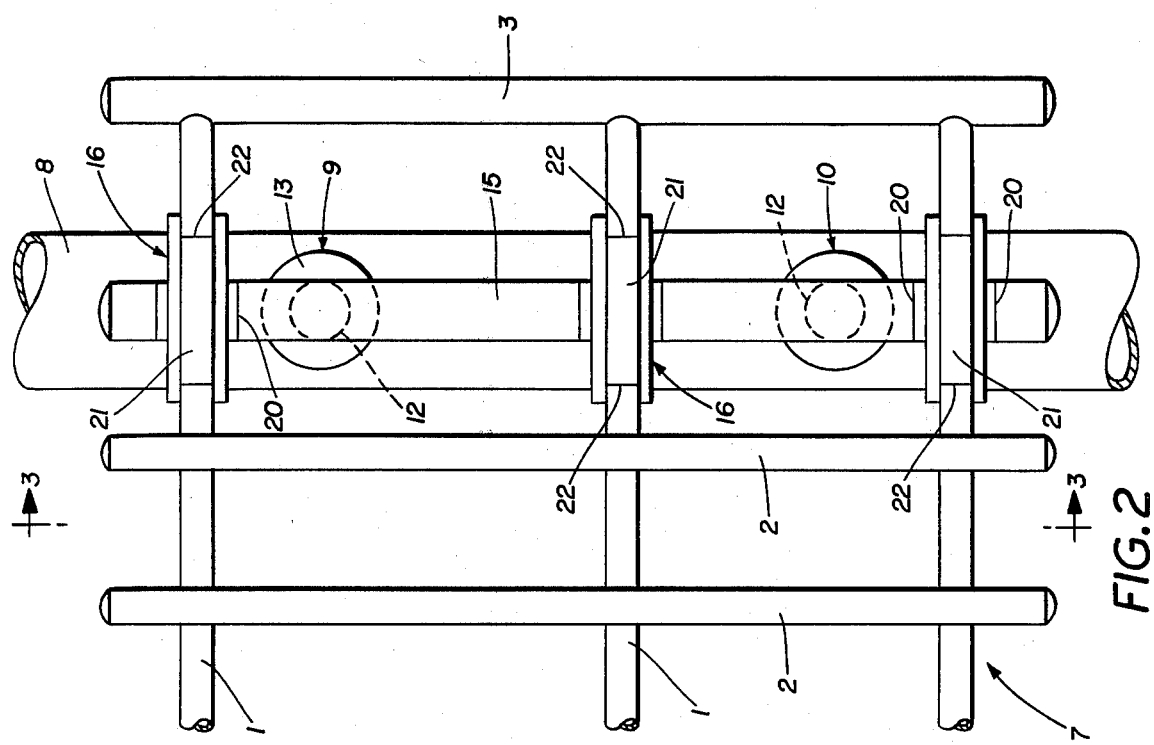
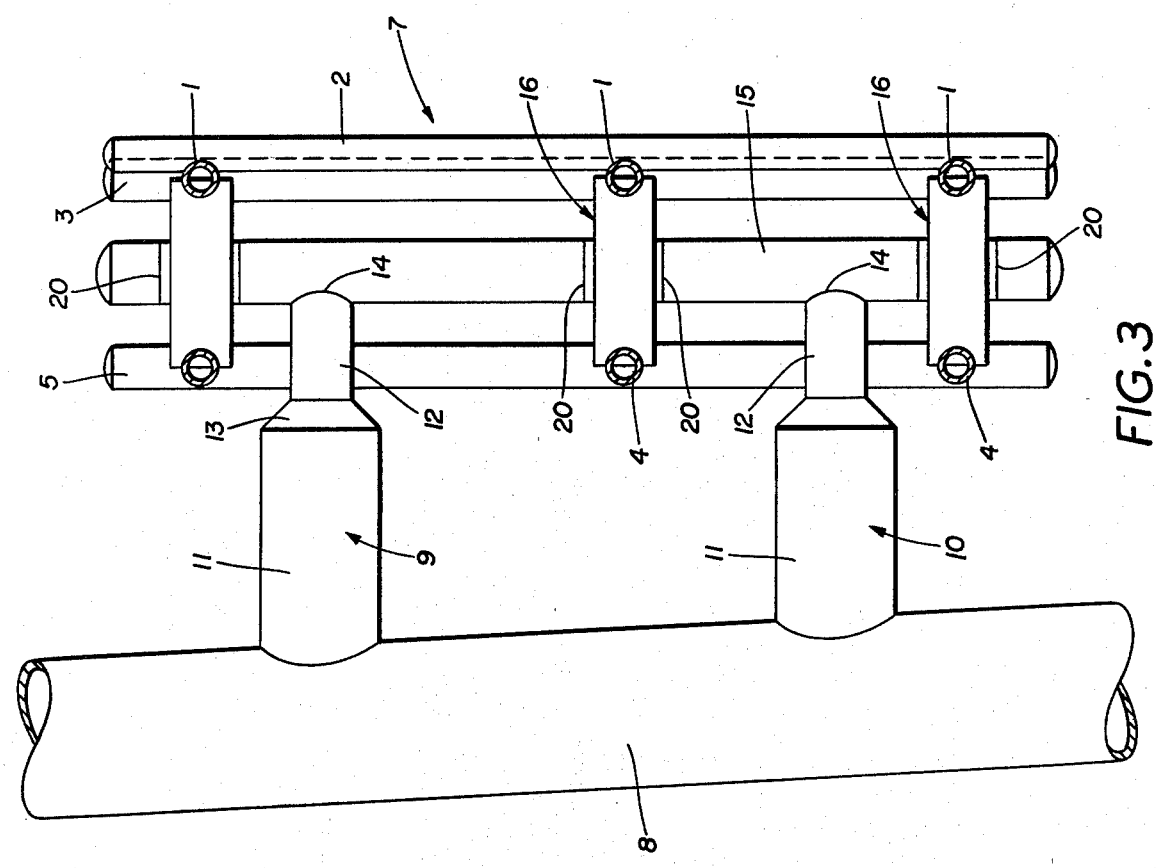

MARINE ENERGY CELL

BACKGROUND OF THE INVENTION

1. Field of the Invention

The invention relates to a marine energy cell construction and more particularly to a mounting construction for supporting a barrier or bumper frame on a plurality of adjacent leg or upright members of a marine or offshore oil rig, docking platform, loading dock or the like to substantially reduce the harmful effect of lateral components of forces to which a barrier frame is subjected when ship, barge or other floating vessel movement nonperpendicular to the general plane of the barrier frame is arrested by the barrier to stop further headway of the vessel during docking.

In addition, the invention relates to a marine structure barrier mounting construction having two different types of energy-absorbing units cooperatively connected so that one unit absorbs energy primarily from resultant force components directed normal to the plane of the barrier frame and the other unit absorbs energy primarily from resultant force components directed parallel to the plane of the barrier frame, said resultant forces being components of the angular direction of ship movement stopped by the barrier frame. This is not to say that either of the units just described do not absorb energy in directions other than those stated.

2. Description of the Prior Art

Traditionally barrier frames for marine docking facilities have been supported extending above and below the water line on shock cells mounted on at least two spaced legs or other upright columns of a docking structure. Such barrier frames usually have consisted of a latticelike rigid assembly of horizontal and vertical metal pipes or the like and may also include trusslike reinforcement of the frame against bending.

Usually vertical pipe members at the ends of the barrier frame are welded to or otherwise mounted in fixed relation with respect to the outer ends of inner cylinder members of shock cells. Such prior shock cells are of a type having outer cylindrical pipe members mounted in fixed position on spaced upright columns of the docking facility structure, and the shock cell inner and outer cylinder members are joined by an intervening rubber sleeve. The shock cells thus absorb energy resulting from the resultant force components normal to the plane of the barrier frame of ship movement stopped by the barrier frame.

Such barriers and barrier mountings function satisfactorily as long as the ship movement force to be absorbed by the shock cells is directed normal to the plane of the barrier frame, or as long as the resultant horizontal component of such force (if the force is angularly directed against the barrier frame) directed normal to the plane of the barrier frame is of great magnitude as compared with the relative resultant component of said force directed parallel to the plane of the barrier frame.

However, when said "parallel" resultant component of the ship movement force is of great magnitude it tends to move the barrier frame laterally in its plane in one direction or the other. This puts stress on the fixed mounting of the barrier frame on the ends of the projecting shock cell inner cylinder members which may break or cause failure of the welded connection or other fixed mounting means of the horizontal barrier members that are welded or otherwise fixed to the outer ends of the inner cylinder shock cell members.

Such failure of a barrier mounting on a marine docking facility, particularly on offshore oil rig structures, results in substantial barrier repair or replacement costs.

I am unaware of any practical solution of the described problem that long has existed in the construction and use of marine docking facility barriers for fending off and stopping ship movement at the docking facility.

Accordingly, there is an unsatisfied need existing in the art for a mounting construction for marine docking facility barriers which functions to absorb energy when the barrier stops ship movement, regardless of the direction of ship movement when contacting the barrier, without damage to the barrier or its mounting.

SUMMARY OF THE INVENTION

Objectives of the invention include providing a new marine docking facility fending barrier mounting construction which absorbs energy in stopping ship movement directed toward the barrier in any direction without damage to any elements of the devices which mount the barrier on the docking facility structure; providing such barrier mounting construction with elements which act to absorb resultant components directd both normal to and parallel with the plane of the barrier, emanating from ship movement stoppage by the barrier; providing such barrier mounting construction in which two different types of energy absorbing elements or units are cooperatively connected together so that one unit acts to absorb energy of forces directed at least axially of said one unit, and so that the other unit acts to absorb energy from forces directed laterally toward said other unit; providing such barrier mounting construction in which each of the different energy absorbing units includes inner and outer tubular or cylinder members joined by an intervening elastomeric sleeve, and in which the elastomeric sleeve of each energy absorbing unit may be stressed in tension, shear or compression in absorbing the energy of forces to which the units are subjected when the barrier arrests movement of a ship; and providing such new barrier mounting construction which achieves the stated objectives in a reliable and efficient manner and which solves problems and satisfies needs that long have existed in the marine docking facility field.

These and other objectives and advantages may be obtained by the new marine docking facility barrier frame mounting construction of the invention, the general nature of which is set forth below, and which may be stated as an energy absorbing device for mounting a ship fending barrier frame on a marine docking structure including first and second energy absorbing units connected together; the first unit having fixed connection with the docking structure and having relatively axially movable tubular elements yieldingly connected together; and the second unit having fixed connection with the barrier frame and having relatively rotatably movable tubular elements yieldingly connected together.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

FIG. 1 is a diagrammatic top plan view with certain parts in section illustrating a truss-reinforced barrier frame mounted on shock cells fixed to upright marine docking facility structure columns using the new mounting construction of the invention;

FIG. 2 is a somewhat diagrammatic enlarged fragmentary front elevation of a portion of the devices shown in FIG. 1 looking in the direction of the arrows 2—2, FIG. 1;

FIG. 3 is a somewhat diagrammatic enlarged fragmentary sectional view taken on the line 3—3, FIGS. 1 and 2;

FIG. 4 is an enlarged sectional view taken on the line 4—4, FIG. 1, illustrating the construction of the new rotary energy absorbing unit forming a cooperative part of the mounting construction for the barrier frame shown in FIGS. 1, 2 and 3;

FIG. 5 is a "before and after" diagram illustrating the manner in which force components directed normal to the plane of the barrier frame are received by one of the energy absorbing units of the new mounting construction; and FIG. 6 is a "before and after" diagram similar to FIG. 5 showing the manner in which the new rotary energy absorbing unit receives forces directed parallel to the plane of the barrier frame and laterally of the rotary unit to absorb and store energy emanating from such forces.

Similar numerals refer to similar parts throughout the various figures of the drawings.

DESCRIPTION OF THE PREFERRED EMBODIMENT

A typical or traditional type of barrier frame for marine docking facilities is shown in FIGS. 1, 2 and 3 and may include a series of horizontal metal pipes 1 to which a series of vertical metal pipes 2 are welded or otherwise connected spaced laterally along the pipes 1. This latticelike structure also may have vertical pipe end member 3 to complete the front or fending portion of the barrier frame structure. The barrier frame structure also may include a series of rear horizontal pipe members 4, the ends of which may be welded to vertical end members 5. Strut members 6 arranged in a trusslike formation may extend between at least the top horizontal frame members 1 and 4 to reinforce the frame and maintain frame rigidity throughout its lateral extent. The generally rectangular barrier frame structure described is generally indicated at 7 in FIG. 1 and this frame, or at least the front frame members 1 and 2, extends generally in an upright vertical plane.

The barrier frame 7 is mounted on typical docking structure columns 8 which may be leg members of the docking structure which thus may have an angular location with respect to the plane of the barrier frame 7.

Each column 8 in a typical manner may be equipped with upper and lower shock cells 9 and 10 having known construction including an outer metal cylinder element 11 connected or joined by welding to the member 8 in spaced relation and extending horizontally outwardly therefrom. Each shock cell 9 and 10 also has an inner metal cylinder element 12, the outer and inner cylinders 11 and 12 of each shock cell being connected together by an elastomeric rubber energy absorbing sleeve 13.

The outer ends of inner shock cell cylinder elements 12 are connected, as by welding, at 14 with a rigid vertical metal pipe or mounting post member 15. The mounting posts 15 are located adjacent the lateral ends of the frame 7. In typical prior barrier frame installations the pipe member 15 forms an integral rigid fixed direct structural part of the barrier frame. In such prior structures the connections of such a vertical member 15 with the shock cells and with other structural members of the barrier frame are welded joints which are stressed and frequently fail when stressed by laterally acting force components of forces directed toward a barrier frame bu ship movement stopped by the barrier frame when such ship movement is oriented in an non-normal direction with respect to the plane of the barrier frame.

In accordance with the invention such problems and difficulties are overcome and avoided by using the special rotary energy absorbing ringlike units characterizing the concepts of the invention, generally indicated at 16, to join the barrier frame 7 with vertical members 15.

Each unit 16 (FIG. 4) includes an inner cylinder member 17, an outer larger diameter cylinder ring 18, and an elastomeric sleeve or ring 19 vulcanized to and joining members 17 and 18.

In making the barrier assembly, inner cylinder members 17 of rotary units 16 are formed as parts of a rigid vertical pipe member 15 by welding sections of the member 15 to the ends of inner cylinder members of rotary units 16, as indicated by the welds 20 (FIG. 3).

The elastomeric rubber sleeve or ring 19 is joined to the members 17 and 18 by molding, casting, or mechanically bonding, or chemically bonding, the elements 17, 18 and 19 together. However, prior to molding or other assembly short parallel pipe connectors 21 are welded to opposite zones of the outer surfaces of the cylinder ring 18.

During assembly of the barrier 7 the ends of pipe sections 21 are welded at 22 to sections of the horizontal frame members 1 (FIG. 2).

A barrier frame 7 constructed in the manner described, using the combination of typical shock cells 9 and 10 cooperatively connected through a rigid pipe member 15 and rotary units 16 with the barrier frame 7, is adapted to absorb without barrier damage the resultant components of force to which the barrier frame is subjected in stopping ship movement when striking the frame 7 at any angle, which resultant components are directed normal to and parallel with the plane of the barrier frame.

Referring first to FIG. 5, the force component acting normal to the plane of the barrier frame 7 is indicated by the arrow 23 in the left-hand portion of the diagram just as a ship impacts the barrier frame. As the energy of the force 23 is absorbed and stored after impact by the mounting, elements of the shock cells 9 or 10 are telescoped to the position shown in the right-hand portion of the diagram, the shock cell sleeve 13 being deformed as shown, and is stressed in tension, shear and compression by such impact.

Meanwhile, the horizontal component of force to which the barrier frame 7 is subjected (FIG. 6) acting parallel with the plane of the barrier frame 7, is indicated by the arrow 24. This arrow may be directed laterally in either direction with respect to the barrier frame 7 in accordance with the angular orientation of the direction of ship movement at the time of impact with the barrier frame as indicated in the left-hand portion of the diagram.

After impact, the resultant force 24 when acting to the right, as shown, will move the entire barrier frame 7 to the right. The improved mounting construction permits the movement shown because the outer cylindrical rings 18 of the rotary units 16 remain stationary with respect to the barrier frame 7, but the inner cylinder members 17 of the units 16 may rotate relative to the cylindrical rings 18 of the units, stressing the rubber sleeves 19 in torsion as indicated by the arrow 25.

The shock cells 9 or 10 even though telescoped to a degree in the manner shown in FIG. 5, permit such relative rotary movement between the cylinder members 17 and 18 of the rotary unit 16 during which the inner cylinders 12 of the shock cells may move to an angular position out of axial alignment, as shown in the righ-hand portion of the FIG. 6 diagram.

During such functioning of the mounting construction involving the cooperative arrangement of the shock cells 9 or 10 with the rotary units 16, the rubber sleeves 13 and 19 of the two types of energy absorbing devices may be variously stressed in tension, shear, compression or torsion.

To summarize, the rotary units 16, shock cells and combination allow the entire barrier installation to deflect upon impact from a vessel in the lateral and/or axial direction. But, the significant aspect of the shock cell/rotary unit combination is that the barrier is allowed to be displaced for any impact point on the barrier. Thus, the kinetic energy generated by a mass in motion is dissipated by all the shock cells 9 or 10 and all the rotary units 16. The shock cells and the rotary units do work; Work=kinetic energy.)

Accordingly, the new barrier frame mounting, the construction and operation of which is described above, satisfies the stated objectives and solves problems and satisfies needs that long have existed in the art.

In the foregoing description, certain terms have been used for brevity, clearness and understanding; but no unnecessary limitations are to be implied beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the new barrier frame mounting is constructed and functions; and the advantageous, new and useful results obtained; the new and useful structures, devices, components, elements, arrangements, parts, combinations, and cooperative relationships are set forth in the appended claims.

I claim:

1. An energy-absorbing device for mounting an extended barrier frame on column members of a marine docking facility structure for stopping ship movement at the facility, including, a pair of shock cells mounted in spaced relation on a docking facility column member; each shock cell having inner and outer cylinder members joined by an intervening rubber sleeve, with one end of the outer cylinder member mounted in fixed position on said column, and an outer end of the inner cylinder member projecting axially horizontally outward of the column; a vertically-extending tubular member mounted in fixed relation on the projecting outer ends of said shock cell inner cylinder members; a plurality of rotary energy-absorbing ring units; each ring unit having an outer cylinder ring, an inner tubular member, and an intervening rubber sleeve joining the outer ring and inner tubular member; the inner tubular members of the rotary ring units forming integral portions at spaced intervals of the vertically-extending tubular member; a barrier frame having a plurality of spaced horizontally-extending frame members; and the horizontally-extending frame members at one end of the barrier frame being mounted in fixed positions on the outer peripheries of the cylinder rings of the rotary ring units.

2. An energy absorbing barrier construction for a marine docking facility structure for stopping ship movement at the facility, including, first and second docking structure columns extending upright in spaced relation; a pair of shock cells mounted in spaced relation on each of said first and second columns; each shock cell having inner and outer cylinder members joined by an intervening rubber sleeve, with one end of the outer cylinder member mounted in fixed position on its respective column; an outer end of each shock cell inner cylinder member projecting axially-horizontally outward of its respective column; a vertically-extending tubular member mounted adjacent each column in fixed relation on the projecting outer ends of the inner cylinder members of shock cells mounted on their respective columns; a plurality of rotary energy-absorbing ring units mounted on each vertically extending tubular member in spaced relation with each other and also in spaced relation with the shock cell mountings of such vertically-extending tubular member; each ring unit having an outer cylinder ring, an inner tubular member, and an intervening rubber sleeve joining the outer ring and inner tubular member; the inner tubular members of the rotary ring units on each vertically-extending tubular member forming integral portions at spaced intervals of such vertically-extending tubular member; a barrier frame having a plurality of spaced horizontally-extending barrier frame members; the ends of the horizontally-extending barrier frame members at each end of the barrier frame being mounted in boxed positions on the outer peripheries of the cylinder rings of the rotary ring units on the vertically-extending tubular members shock cell mounted on adjacent respective columns.

3. Energy absorbing mounting construction for mounting on a marine docking structure a generally rectangular ship fending barrier frame of the type in which energy absorbing shock cell units connect each corner of said frame to a member of said docking structure and wherein said shock cell units are of a type having inner and outer relatively movable elongated metal tubular elements and an intervening sleeve of elastomeric material vulcanized-bonded to said inner and outer tubular elements, and wherein the outer ends of the inner tubular elements of said shock cell units have fixed connection with vertical mounting post members located adjacent lateral ends of said rectangular barrier frame wherein the improvement comprises:

(a) an energy absorbing ringlike unit connected at least in the region of each frame corner adjacent the fixed connections of the inner tubular elements of said shock cell units with the upper and lower ends of said vertical mounting post members; and (b) each energy absorbing ringlike unit having an outer ring with fixed connection with said barrier frame, and having an elastomeric ring having vulcanized-bonded connection with the interior of said outer ring and with the exterior of said mounting post member;

(c) whereby said energy absorbing ringlike units permit tensional, compressive, shear and torsional stress and combinations thereof to absorb energy when the shock cell unit mounted barrier frame is struck at any point regardless of the direction of ship movement in any direction.

* * * * *